United States Patent
Hutter et al.

(12)

(10) Patent No.: US 6,176,133 B1
(45) Date of Patent: Jan. 23, 2001

(54) FUEL SENDING UNIT HAVING A FUEL FILTER COMBINED WITH A FUEL FLOAT

(76) Inventors: Robert B. Hutter, 41605 Ann Arbor Rd., Plymouth Township, MI (US) 48170; Brian C. Lazarus, 21165 Chase Dr.; Stephen D. Lazarus, 21992 Chase Dr., both of Novi, MI (US) 48375; Donna M. Hale, 38295 Harper, Clinton Township, MI (US) 48036

( * ) Notice: Under 35 U.S.C. 154(b), the term of this patent shall be extended for 0 days.

(21) Appl. No.: 09/264,560

(22) Filed: Mar. 8, 1999

(51) Int. Cl.[7] .............................. G01F 13/00; G01F 23/76
(52) U.S. Cl. ........................ 73/306; 73/322.5; 73/317; 73/313; 338/33; 210/416.4; 137/565
(58) Field of Search ............................ 73/305, 306, 298, 73/317, 309, 316, 322.5, 313; 210/416.4; 417/40; 137/549, 565; 200/84 C; 338/33

(56) References Cited

U.S. PATENT DOCUMENTS

| | | | |
|---|---|---|---|
| 3,348,413 | * | 10/1967 | Zimmerle ................................ 73/313 |
| 3,449,955 | * | 6/1969 | Stadelmann ........................... 73/313 |
| 3,925,747 | * | 12/1975 | Woodward et al. ................... 73/313 |
| 4,427,542 | * | 1/1984 | Glover .................................. 210/121 |
| 4,790,185 | * | 12/1988 | Fedelem et al. ...................... 73/317 |
| 5,293,899 | * | 3/1994 | Kwon .................................. 137/544 |
| 5,765,435 | * | 6/1998 | Grotschel et al. ..................... 73/313 |

* cited by examiner

*Primary Examiner*—Hezron Williams
*Assistant Examiner*—Michael Cygan
(74) *Attorney, Agent, or Firm*—Kenneth H. Maclean

(57) ABSTRACT

A fuel sending unit assembly includes a pump for pumping fuel from a storage system to a combustion system, a float for measuring the level of fuel remaining in the storage system, and a filter for preventing debris contained in the fuel from entering the combustion system. The assembly is characterized by the filter being attached to the float. In this manner, the assembly intakes fuel from the fuel surface rather than debris or liquid contaminants which have settled on the bottom of the tank. In a preferred embodiment, the assembly further includes a tube for attaching the float to the pump and for channeling fuel from the filter to the pump.

3 Claims, 2 Drawing Sheets

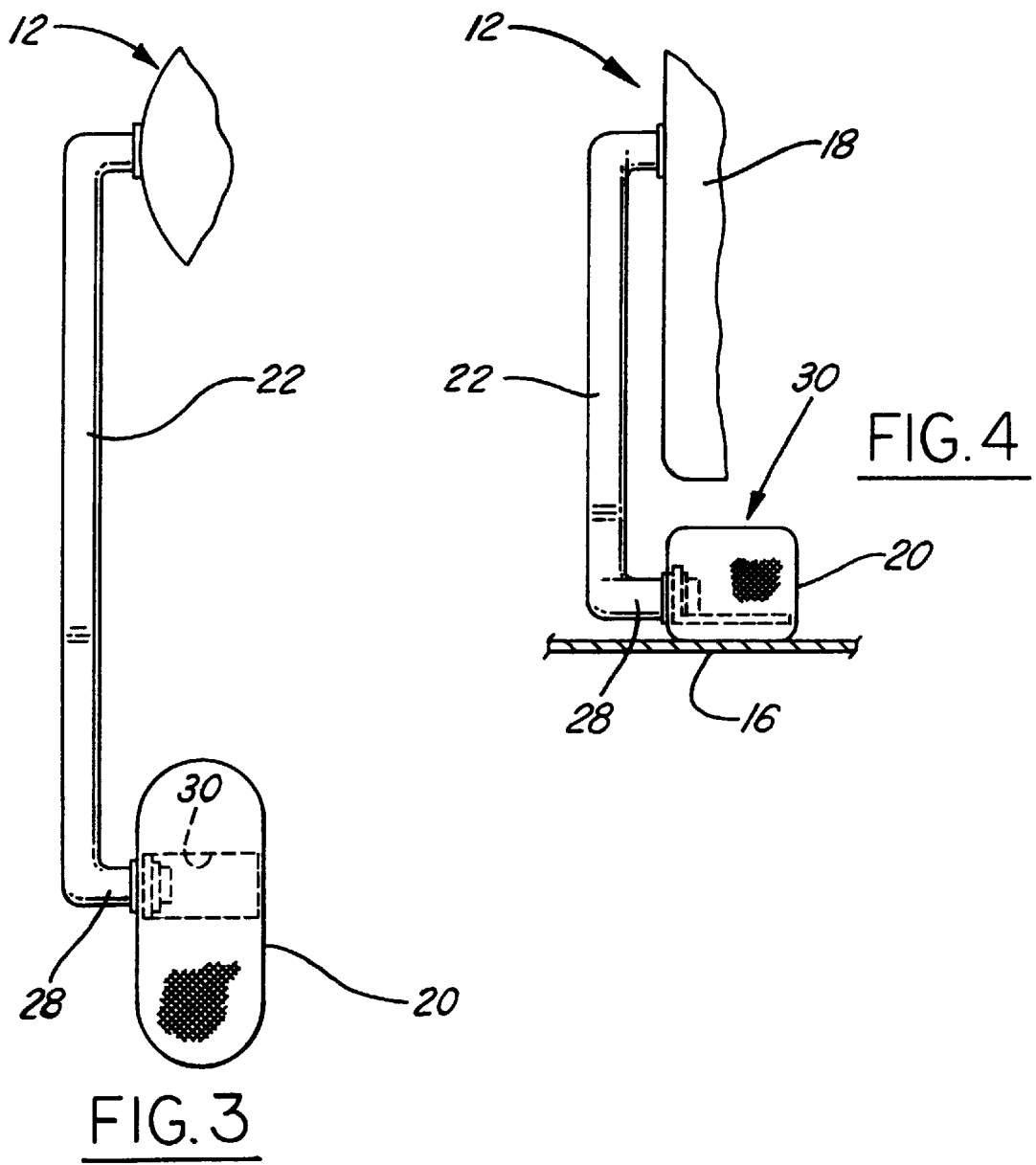

FUEL SENDING UNIT HAVING A FUEL FILTER COMBINED WITH A FUEL FLOAT

FIELD OF THE INVENTION

The subject invention relates to a fuel sending unit having a fuel filter combined with a fuel float.

BACKGROUND OF THE INVENTION

Most modern vehicles include a combustion engine and a tank for storing fuel to be ignited and burned by the engine. Typically, a fuel sending unit is mounted inside the tank to monitor the amount of fuel in the tank and control the delivery of fuel from the tank to the engine. The fuel sending unit commonly includes a float for measuring the fuel level and a pump for pumping fuel from the tank to the engine.

Occasionally, contaminated fuel is pumped into the tank. Contaminated fuel is fuel which contains debris and/or liquid contaminants such as water. Typically, the debris or liquid contaminants settle on the bottom of the tank. To prevent the debris from damaging the engine, a filter is used to screen the debris prior to entering the fuel combustion system. Although prior art filters catch most debris, they have several shortcomings. Foremost, prior art filters have been positioned on or near the bottom of the tank. As a result, the pump intakes potentially contaminated fuel from the bottom of the tank rather than uncontaminated fuel from the fuel surface. Thus, it would be desirable to provide a filter which overcomes the shortcomings of the prior art.

SUMMARY OF THE INVENTION

A fuel sending unit assembly includes a pump for pumping fuel from a storage system to a combustion system, a float for measuring the level of fuel remaining in the storage system, and a filter for preventing debris contained in the fuel from entering the combustion system. The assembly is characterized by the filter being attached to the float. In this manner, the assembly intakes fuel from the fuel surface rather than debris or liquid contaminants which may have settled on the bottom of the tank. In a preferred embodiment, the assembly further includes a tube for attaching the float to the pump and for channeling fuel from the filter to the pump.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a fragmented top view of the fuel sending unit assembly showing one embodiment of a combined fuel filter and fuel float in accordance with the present invention; and FIG. 4 is a fragmented side view of the fuel sending unit assembly showing the combined fuel filter and fuel float.

DETAILED DESCRIPTION OF THE PREFERRED EMBODIMENT

Figure 1:
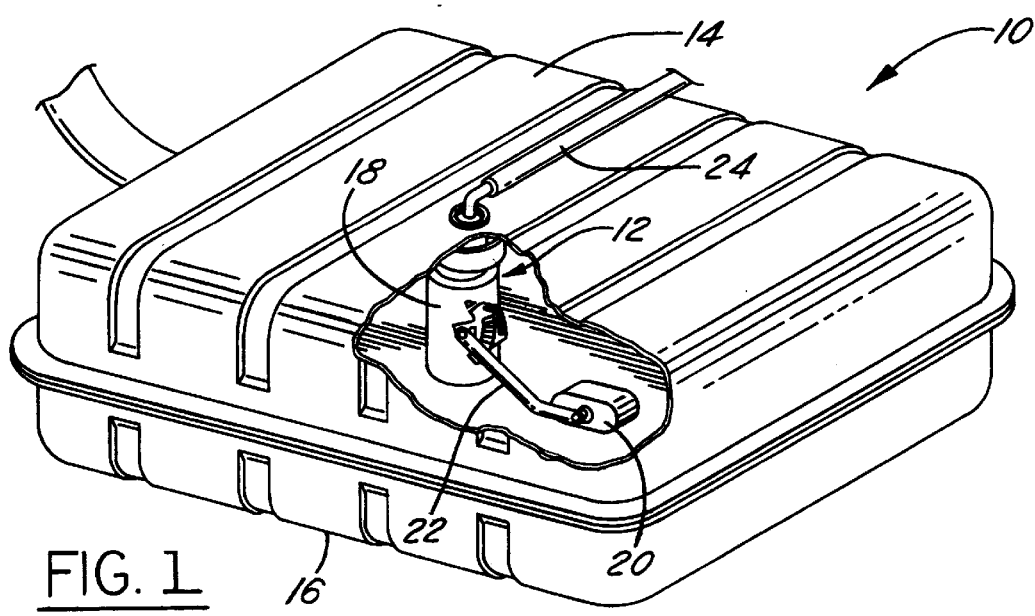
FIG. 1 is a perspective view of a fuel tank fragmented to show a fuel sending unit assembly in accordance with the present invention.

Referring to the Figures, wherein like numerals indicate like or corresponding parts throughout the several views, a fuel tank 10 is fragmented to reveal a fuel sending unit assembly 12 in FIG. 1. The tank 10 is a leak-proof container having a top surface 14 and a bottom surface 16. The sending unit assembly 12 is mounted inside the tank 10 to monitor the amount of fuel in the tank 10 and control the delivery of fuel from the tank 10 to an engine. The sending unit assembly 12 includes a fuel pump IS for pumping fuel from the tank 10 to the engine, a fuel float 20 for measuring the fuel level, and a float arm 22 for connecting the float 20 to the assembly 12. Fuel is pumped from the tank 10 to the engine through a fuel line 24.

Figure 2:
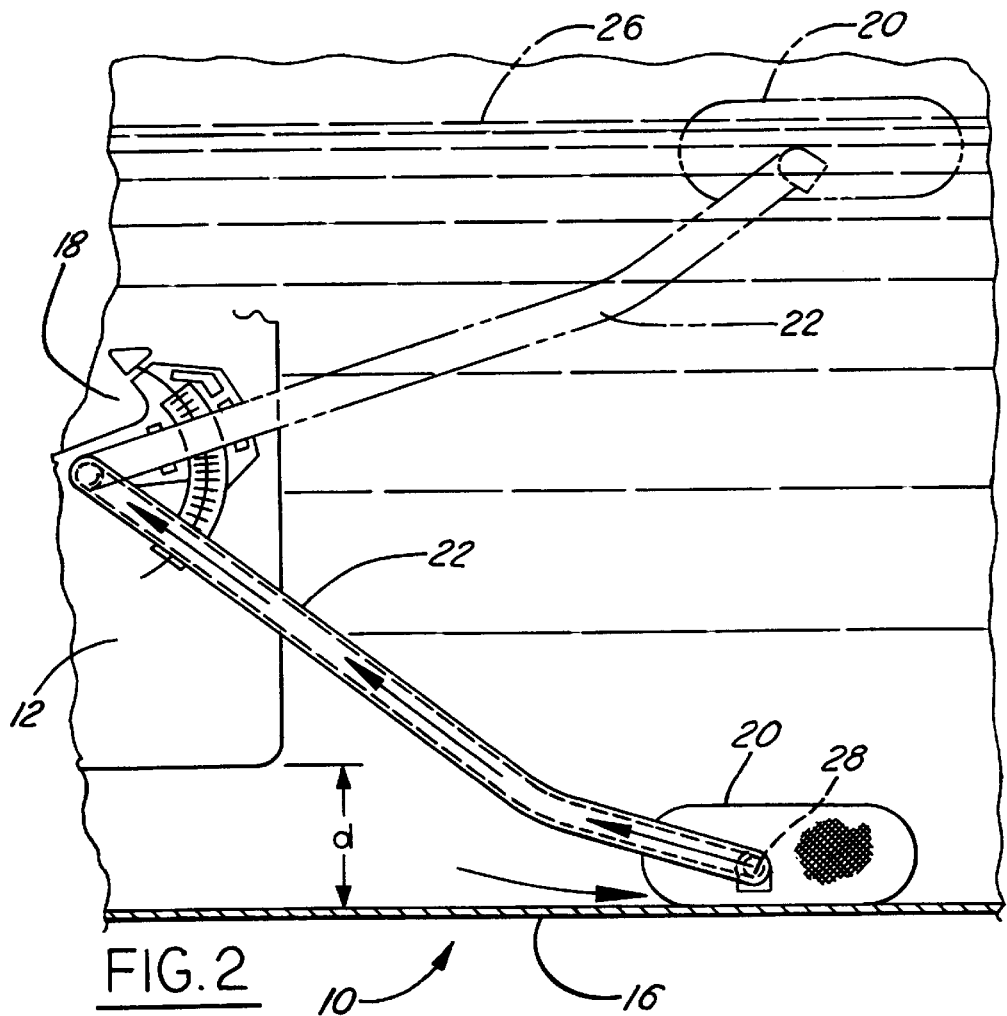
FIG. 2 is a fragmented front view of the fuel sending unit assembly in the fuel tank.

FIG. 2 is a fragmented front view of the sending unit assembly 12 inside the tank 10. The arm 22 is rotatable with respect to the pump 18 and with respect to the float 20 thereby allowing the float 20 to remain on the fuel surface. In FIG. 2, the fuel level 26 is illustrated with phantom lines. As fuel is delivered to the engine, the fuel level 26 decreases. When the tank 10 is refilled with fuel, the fuel level 26 increases. Thus, the tank 10 may contain varying fuel levels 26 as shown in FIG. 2.

In FIG. 2, the float 20 and the arm 22 are illustrated in an empty tank condition with solid lines and a full tank condition with dash and dot lines. In the empty tank condition, the float 20 rests upon the bottom 16 of the tank 10. In the full tank condition or any partially filled condition, the float 20 is adapted to float on the fuel surface.

In a preferred embodiment of the present invention, the arm 22 is made from hollow tubing. As a result, the arm 22 is adapted to channel fuel from an inlet end 28 of the arm 22 to the pump 18. In FIG. 2, arrows indicate the flow of fuel through the arm 22 to the pump 18. Preferably, the arm 22 is made from a hollow aluminum tubing.

The sending unit assembly 12 further includes a fuel filter to prevent debris contained in the fuel from entering the engine. In accordance with the present invention, the filter is attached to the float 20. As a result, the filter remains at the fuel surface as the fuel level 26 increases and decreases. In this manner, fuel is filtered from the fuel surface thereby avoiding the intake of potentially contaminated fuel which may have settled to the bottom 16 of the tank 10. In the preferred embodiment, the filter is attached to the float 20 at the inlet end 28 of the arm 22.

In keeping with the spirit of the invention to intake fuel from the fuel surface rather than the bottom 16 of the tank 10, there are numerous ways in which the filter may be attached to the float 20. The following embodiments are included for illustrative purposes only and are not intended to limit the scope of the present invention.

FIG. 3 is a fragmented top view of the sending unit assembly 12 showing one embodiment of a combined fuel filter 30 and fuel float 20 in accordance with the present invention. The filter 30, illustrated in phantom lines, is packaged inside the float 20. The filter 30 is attached to the inlet end 28 of the arm 22 thereby preventing debris from reaching the pump 18. Accordingly, the float 20 must be adapted to permit fuel to pass from the tank 10 to the filter 30 while remaining at the fuel surface. One way to accomplish this objective might be to provide passageways from surface of the float 20 to the filter 30.

FIG. 4 is a fragmented side view of the sending unit assembly 12 showing the combined filter 30 and float 20. In FIG. 4, the float 20 and the arm 22 are illustrated in the empty tank condition to show the position of the filter 30 relative to the bottom 16 of the tank 10 when the tank 10 is empty.

In a second embodiment, the filter 30 is connected to the inlet end 28 of the arm 22 and attached to the bottom surface of the float 20. In a third embodiment, the inlet end 28 of the arm 22 is attached to the float 20 and the filter 30 is positioned elsewhere within the assembly 12, for example within the arm 22 or the pump 18.

The present invention allows the sending unit assembly 12 to be mounted a distance d above the bottom 16 of the tank 10 as shown in FIG. 2. This is especially advantageous for shallow designed fuel tanks.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A fuel sending unit assembly mounted within an enclosed fuel tank comprising:

a pump for pumping fuel from the fuel tank to a combustion system;

an elongated, hollow tube extending between an inlet end in fluid communication with the fuel in the fuel tank and an outlet end pivotally attached to said pump for channeling fuel to said pump;

a filter attached to said inlet end of said tube for preventing debris contained in the fuel from entering the combustion system; and a float pivotally attached to said inlet end of said tube for measuring the level of fuel remaining in the fuel tank; and said said filter being integrated with said float.

2. A fuel sending unit assembly mounted within an enclosed fuel tank comprising:

a pump for pumping fuel from the fuel tank to a combustion system;

an elongated, hollow tube extending between an inlet end in fluid communication with the fuel in the fuel tank and an outlet end pivotally attached to said pump for channeling fuel to said pump;

a filter attached to said inlet end of said tube for preventing debris contained in the fuel from entering the combustion system;

a float pivotally attached to said inlet end of said tube for measuring the level of fuel remaining in the fuel tank; and said said filter being positioned inside and completely enclosed by said float.

3. A fuel sending unit assembly as set forth in claim 2 wherein said float includes a plurality of fluid passageways for allowing fuel from the fuel tank to pass through said float to said filter and said inlet end of said tube.

* * * * *